April 13, 1948. H. A. BROWN ET AL 2,439,770
ELECTRICALLY INDICATING LIQUID FILLED MANOMETER
Filed Jan. 29, 1945
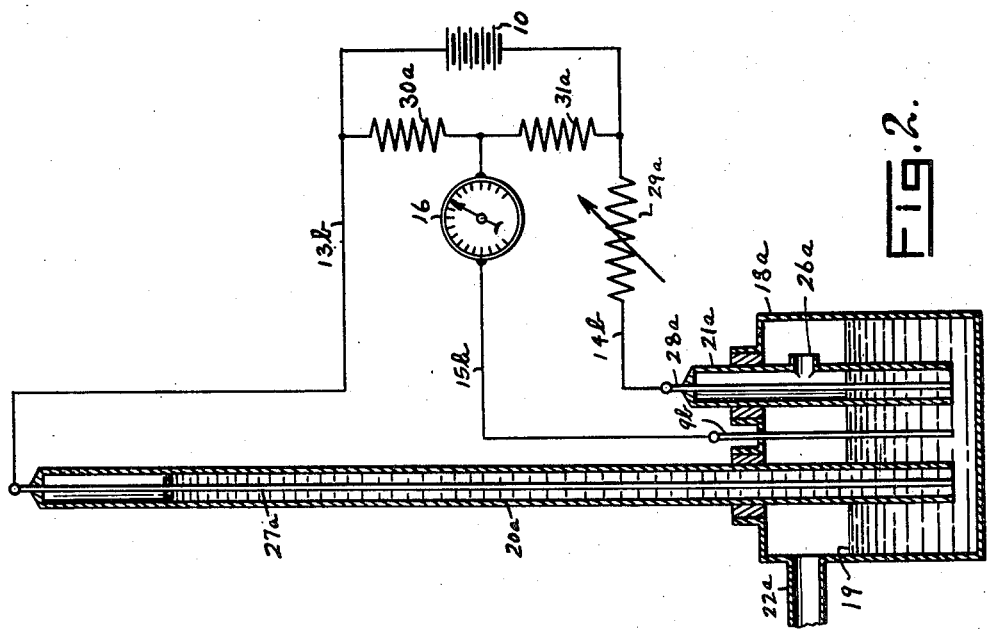
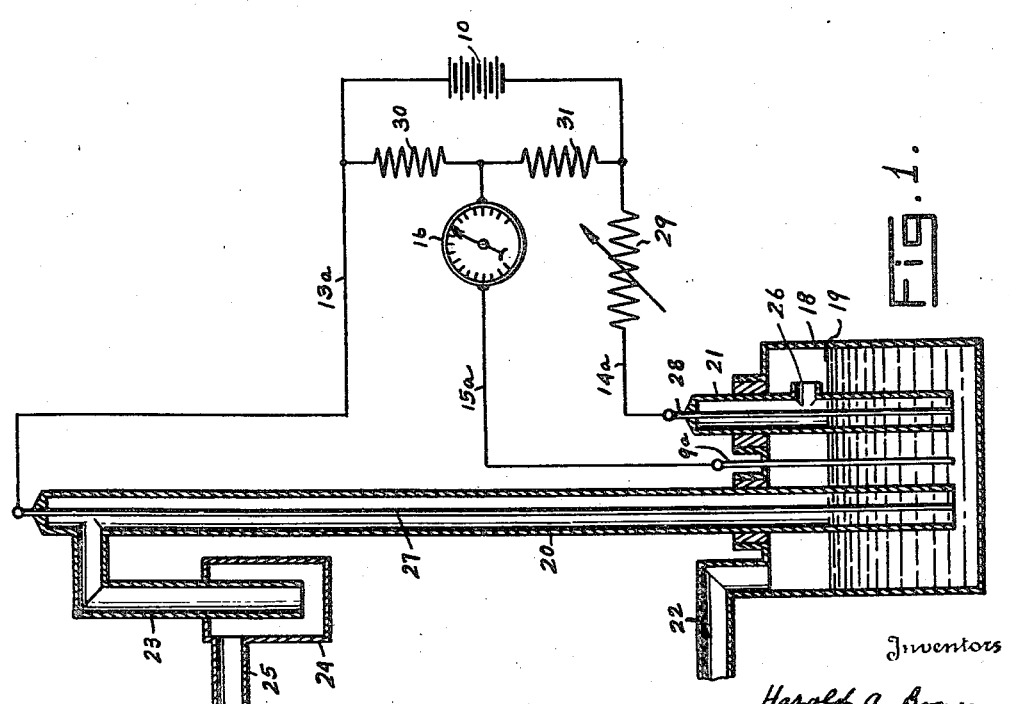
Inventors
Harold A. Brown
Harry Gollob
By
E. V. Hardway
Attorney Patented Apr. 13, 1948

2,439,770

UNITED STATES PATENT OFFICE 2,439,770

ELECTRICALLY INDICATING LIQUID FILLED MANOMETER

Harold A. Brown, State College, N. Mex., and Harry Gollob, El Paso, Tex.

Application January 29, 1945, Serial No. 575,164

2 Claims. (Cl. 73—398)

1

This invention relates to an electrically indicating liquid filled manometer.

An object of the invention is to provide pressure and pressure differential indicating equipment of the character described embodying a construction whereby electrically conductive liquid may be employed to vary the resistance of a resistor or resistors in combination with a meter for indicating the variation. In this construction the movement of said liquid along the resistance element produces a continuously variable contact on the resistor or resistors.

A further object of the invention is to provide equipment of the character described which is very simple, of light construction and can be cheaply produced and assembled in small space.

The pressure and pressure differential indicator may be used as a barometer, as pressure, vacuum and pressure differential gauges, altimeter, fuel and air ratio indicator and for indicating rates of climb, when used on aircraft, and as a manifold pressure gauge; and for testing purposes for testing aircraft instruments such as altimeters, manifold pressure gauges, air speed indicators, rate of climb, turn and bank indicators.

The embodiments of the invention illustrated may also be used for operating electronic devices and used as commercial units, such as a weight scale and weight control units as well as for alarm signal devices; they may also be adapted for use in the medical profession where such pressure, vacuum and differential and pressure devices are used as for example: blood pressure indicating devices and the like.

The type of indicating equipment herein described may be used for various other purposes and the application and use thereof is not intended to be limited to the above specified purposes which are set forth merely for the purpose of illustration.

With the above and other objects in view the invention has particular relation to certain novel features of construction, operation and arrangement of parts, examples of which are given in this specification and illustrated in the accompanying drawings wherein:

Figure 1 shows a vertical sectional view of one embodiment of the invention and, Figure 2 shows a vertical sectional view of another embodiment.

Referring now more particularly to the drawings numerals 18, 18a indicate fluid containing vessels of any suitable design and made of any suitable material either electrically conductive or non-conductive and which are partly filled with

2 an electrically conducting fluid 19, such as mercury. Manometer tubes 20, 20a are extended through the tops of these vessels and sealed therein, as are also the compensating tubes 21, 21a. The manometer tubes and compensating tubes may be of any suitable design and any suitable material either electrically conductive or non-conductive. These tubes are sealed within, and secured to the vessels, in any approved manner as shown.

Connections 22, 22a to a pressure line or to atmosphere are provided and are connected into the respective vessels 18, 18a above the level of the fluid therein.

In the embodiment illustrated in Figure 1 there is a connection 23 into the upper end of the manometer tube 20 whose end is connected into an air trap 24 which trap is connected either to atmosphere or to a vacuum line through the connection 25. This trap is included so that if excessive pressure be applied to connection 22 the fluid 19 will not be forced out through the connection 25 and into the atmosphere or other equipment connected to connection 25.

The compensating tubes 21, 21a are provided with vents, above the fluid level, 26, 26a to equalize the pressures inside and outside of the corresponding compensating tubes.

There are the main electrodes or resistances rods 27, 27a in the manometer tubes 20, 20a which are sealed in the tops of said tubes and extend the full length thereof; also there are the electrodes or compensating resistance rods 28, 28a in the compensating tubes 21, 21a which are sealed in the upper ends thereof and which extend the full length thereof.

The resistance rods 27, 28 and 27a, 28a are made of suitable resistance material and their exposed portions, that is, those parts not covered by mercury or fluid, together with the conducting fluid, in combination, constitute branches of the respective Wheatstone bridge circuits. There are also the resistors 29, 30 and 31 connected by conductors 13a, 14a, with electrodes 27 and 28 and the resistors 29a, 30a and 31a, either fixed or adjustable, connected by conductors 13b, 14b, with electrodes 27, 28a and these resistors 29, 30, 31 and 29a, 30a and 31a constitute the other branches of the respective circuits in these Figures 1 and 2.

A third electrode may be extended through the top of each vessel 18, 18a and sealed within said top. They are indicated by the numerals 9a and 9b and are in constant contact with the electrically conductive fluid in the vessels 18, 18a; they may be otherwise arranged but must make electrical contact with said fluid.

The embodiments shown in Figures 1 and 2 also include the galvanometers 16, 16 and are provided with the batteries 10, 10. The electrodes 9a, 9b are connected with said galvanometers by the bridge wires 15a, 15b.

Referring to the embodiment shown in Figure 1 the vessel 18 and its tubes 20, 21 and connections 22, 25 are herein designated as the transmitter; the resistors 29, 30, and 31 are herein designated as the balancer or zero setting device and the galvanometer 16 is designated as the indicator. In the embodiment illustrated in Figure 2 the vessel 18a and its tubes 20a, 21a and the connection 22a are designated as the transmitter while the resistors 29a, 30a and 31a are here designated as the balancer or zero setting device and galvanometer 16 is designated as the indicator.

The space above the liquid in tube 20a should be completely evacuated. The space above the liquid in the tube 20 remains filled with atmosphere at the existing atmospheric pressure.

The transmitter, balancer and indicator may be situated or placed in the most suitable locations respectively and in connection with all of the embodiments it may be stated that the electrical conductors 13, 14, and 13b, 14b may be flexible and may be of any selected length.

In the embodiment illustrated in Figure 1 the pressure applied or existing at the connection 25 should be less than the pressure applied or existing at the connection 22. The pressure applied at either of said connections may be atmospheric or other arbitrary pressure. Any pressure to be measured or compared which is less than said arbitrary pressure or atmospheric pressure, as the case may be, should be applied at the connection 25. Any pressure to be measured or compared which is more than the reference pressure, or atmospheric pressure, as the case may be, should be applied at the connection 22.

Any pressure difference or pressure differential existing between the connections 22 and 25, the pressure connection 22 being greater than the pressure connection at 25, will cause the conductive fluid to rise in the manometer tube 20 and to drop a smaller amount in the compensating tube 21 and vessel 18. This displacement of the fluid will cause a change in the total electrical resistance of the transmitter unit consisting of the exposed portions of the resistors 27, 28, and the fluid 19.

The change of resistance of the transmitter unit will cause an unbalancing of the Wheatstone bridge circuit which will be manifested by the deflection of the indicator.

In the embodiment illustrated in Figure 2 any pressure slightly greater than atmospheric pressure that is within the range of the instrument, or any pressure less than atmospheric pressure will cause a displacement of the conductive fluid. This displacement of the fluid will cause a change in the total electrical resistance of the transmitter unit composed of the exposed portions of the resistors 27a, 28a and the conductive fluid. The change of the resistance of the transmitter unit will cause an unbalancing of the Wheatstone bridge circuit which will be manifested by the deflection of the indicator.

The indicator in each embodiment is calibrated into suitable units.

The embodiment illustrated in Figure 2 may be modified by filling the space above the conductive liquid in the tube 20a with a suitable gas, thereby establishing a suitable pressure on the upper surface of said fluid in said manometer tube. The transmitter may then be used to give an indicator deflection of pressure increase applied at the connection 22a.

The compensating tubes 21 and 21a containing the resistance rods 28, 28a, respectively, are provided as a convenient means of sealing and supporting said resistance rods in the vessels 18, 18a. The resistance rods 28, 28a are provided to effect a compensation of the bridge or electrical circuit as the fluid level in the vessels 18, 18a are changed due to a loss or gain of fluid in the tubes 20, 20a. The tubes 21 and 21a will furthermore insure that the effects due to concavity or convexity of the fluid surface, that is the meniscus effects will be identical on resistance rods 27 and 28 or on resistance rods 27a and 28a. Inasmuch as the tubes 21 and 21a have as their purpose the provision of a convenient and practical support for resistance rods 28 and 28a and the provision of compensation for meniscus effects, said tubes are provided with the vents 26 and 26a to equalize pressures inside and outside of the compensating tubes.

In each of the embodiments one or more indicators may be used with a single transmitter and the indicator units may be calibrated in terms of any suitable units used for marking the dials of any instrument which indicates pressure, vacuum, or pressure differential; also the indicator units may be calibrated in terms of any of the units used for marking the dial of any instrument whose operation depends upon pressure, vacuum or pressure differential.

The Wheatstone bridge circuit has been shown for the purpose of illustration only and not by way of limitation.

The indicator unit may be constructed with interchangeable dial scales so that the reading may be in the desired units using the same meter movements.

The dials of these indicators may be calibrated in units; such as inches of mercury, centimeters of mercury, millibars, miles per hour, knots per hour, elevation in feet or thousands of feet, elevation in meters, inches of mercury vacuum, inches of mercury pressure, inches of water, oil or other liquids, pounds, ounces, pounds per square inch, revolutions per minute, degrees, minutes, seconds and any and all other units, commercial, medical and of other professions or trades.

The drawings and description are illustrative merely while the broad principle of the invention will be defined by the appended claims.

What we claim is:

1. An instrument of the character described comprising, a container, a manometer tube extending through the top of the container, a compensating tube extending through the top of the container, said tubes being sealed with the top of the container, an electrically conductive fluid in the container in which the lower ends of said tubes are submerged, said compensating tube having a vent within the container above the level of said fluid, electrodes in, and sealed with the upper ends of said tubes and whose lower ends extend into the fluid in the vessel, electrical means, including a galvanometer, connected to the electrodes and also including resistors and effective to indicate the resistance of the electrodes and means for applying pressure to the surface of the fluid in the container whereby said fluid is moved along the electrodes to vary their resistance.

2. An instrument of the character described comprising, a container, a manometer tube extending through the top of the container, a tubular connection connected into the top of said tube and including an air trap, a compensating tube extending through the top of the container, said tubes being sealed with the top of the container, an electrically conductive fluid in the container in which the lower ends of said tubes are submerged, said compensating tube having a vent in the container above the level of said fluid, electrodes in, and sealed with the upper ends of said tubes and whose lower ends extend into the fluid in the container, a third electrode extended through and sealed with the top of the container and extending into the fluid, electrical means, including a galvanometer, electrically connected with said third electrode, said electrical means being connected to the electrodes in said tubes and also including resistors in electrical connection with said galvanometer and being effective to indicate the resistance of the electrodes and means for applying pressure to the surface of the fluid in the container whereby said fluid is moved along the electrodes to vary their resistance.

HAROLD A. BROWN.
HARRY GOLLOB.

REFERENCES CITED

The following references are of record in the file of this patent:

UNITED STATES PATENTS

| Number | Name | Date |
| --- | --- | --- |
| 1,534,909 | Browne | Apr. 21, 1925 |
| 2,018,431 | Wolf | Oct. 22, 1935 |

FOREIGN PATENTS

| Number | Country | Date |
| --- | --- | --- |
| 579,549 | Germany | June 28, 1933 |